United States Patent
Chiu et al.

(10) Patent No.: US 9,298,199 B2
(45) Date of Patent: Mar. 29, 2016

(54) VOLTAGE GENERATING CIRCUIT AND POLAR TRANSMITTER

(71) Applicant: MEDIATEK INC., Hsin-Chu (TW)

(72) Inventors: Wei-Hao Chiu, Taichung (TW);
Kun-Yin Wang, Tainan (TW);
Ang-Sheng Lin, Kaohsiung (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/459,305

(22) Filed: Aug. 13, 2014

(65) Prior Publication Data
US 2016/0048145 A1    Feb. 18, 2016

(51) Int. Cl.
H04L 27/00     (2006.01)
G05F 1/46      (2006.01)
H04B 1/04      (2006.01)
H04L 27/20     (2006.01)

(52) U.S. Cl.
CPC ............. *G05F 1/46* (2013.01); *H04B 1/0475* (2013.01); *H04L 27/20* (2013.01); *H04B 2001/0416* (2013.01); *H04B 2001/0433* (2013.01)

(58) Field of Classification Search
USPC ........... 375/297, 295; 327/541, 543; 330/278; 323/282
See application file for complete search history.

(56) References Cited

U.S. PATENT DOCUMENTS

| | | |
|---|---|---|
| 2009/0289720 A1 | 11/2009 | Takinami |
| 2012/0049960 A1 | 3/2012 | Hsu |
| 2012/0108187 A1 | 5/2012 | Kitamura |
| 2012/0268093 A1* | 10/2012 | Yamada ................. 323/283 |
| 2013/0187624 A1* | 7/2013 | Wakasugi ............... 323/282 |
| 2015/0097543 A1* | 4/2015 | Kobayashi et al. ...... 323/282 |

FOREIGN PATENT DOCUMENTS

WO    2008008176 A2    1/2008

OTHER PUBLICATIONS

Patrick Reynaert et al., A 1.75-GHz Polar Modulated CMOS RF Power Amplifier for GSM-EDGE, Dec. 2005, pp. 2598-2608, vol. 40, No. 12, IEEE Journal of Solid-State Circuits.

* cited by examiner

*Primary Examiner* — Khai Tran
(74) *Attorney, Agent, or Firm* — Winston Hsu; Scott Margo

(57) ABSTRACT

A voltage generating circuit comprising: an output current generating circuit, generating an output current, such that an output voltage is generated at an output terminal, according to an output voltage control signal; a comparing device, comprising a first input terminal receiving a reference voltage, a second input terminal receiving a feedback voltage related with the output voltage, and an output terminal outputting the output voltage control signal according to the reference voltage and the feedback voltage; an adjustable voltage dropping circuit, comprising a first terminal coupled to the second input terminal, and a second terminal coupled to the output terminal; and a current source, for generating a predetermined current to the first terminal of the adjustable voltage dropping circuit, thereby the feedback voltage is generated at the first terminal of the adjustable voltage dropping circuit. The predetermined current flows through the adjustable voltage dropping circuit to the output terminal.

12 Claims, 6 Drawing Sheets

VOLTAGE GENERATING CIRCUIT AND POLAR TRANSMITTER

BACKGROUND

The present application relates to a voltage generating circuit, and particularly relates to a voltage generating circuit for generating an analog data signal for a polar transmitter.

A Wireless communications system generally uses radio frequency (RF) signals to transmit data from a transmitter to one or more receivers. Wireless communication systems are frequently used to implement wireless local area networks (LANs) in which data is transmitted and received between computers, servers, Ethernet switches, hubs, and the like. A wireless LAN may, for example, enable web page data to be transferred between a server and a computer.

Wireless communication systems often transmit data through transmitters via polar transmission architectures. Polar transmission architectures may reduce the size and power consumption of a transmitter via removing one or more up-mixing stages from the transmitter. Polar transmitters are typically configured to transmit data based upon at least one amplitude data signal and at least one phase data signal.

FIG. 1 is a block diagram illustrating a conventional polar transmitter 100. As illustrated in FIG. 1, the polar transmitter 100 comprises a phase data generating module 101, and an amplitude data generating module 103. The phase data generating module 101 generates at least one phase data signal PDS based on an initial signal IS according to a phase control signal PCS. The amplitude data generating module 103 generates the amplitude data signal ADS. Furthermore, the phase data signal PDS and the amplitude data signal ADS are modulated to generate a modulated signal MS. Accordingly, a modulating circuit can be comprised in FIG. 1 (not illustrated here) to modulate the phase data signal PDS and the amplitude data signal ADS. The order for the phase data generating module and the amplitude data generating module can be switched. Alternatively, the two actions for the two modules can be down by a single module with two control terminals.

FIG. 2 is a circuit diagram illustrating the amplitude data signal generating module 103 in FIG. 1. As shown in FIG. 2, the amplitude data signal generating module 103 comprises: a digital to analog converter 201, an amplifier 203 (i.e. an OP), an output current generating circuit (in this example, a PMOSFET) 205, a voltage dividing circuit 207, and an amplitude data signal generating circuit 209. The digital to analog converter 201 converts a digital input signal DI, which is related with a desired analog data signal ADS, to an analog input signal AI. The amplifier 203 compares the analog input signal AI with a feedback voltage Vd, which is generated via frequency-dividing the output voltage Vo by the voltage dividing circuit 207, to generate an output voltage controlling signal SVo. The output current generating circuit 205 (in this example, a PMOSFET) generates an output current Io to the output terminal OT, such that the output voltage Vo is generated based on the loading of the amplitude data signal generating circuit 209 and the voltage dividing circuit 207. The amplitude data signal generating circuit 209 generates the analog data signal ADS according to the output voltage Vo. Via above-mentioned operations, a desired analog data signal is generated.

However, the current from the digital to analog converter 201 cannot flow to the amplitude data signal generating circuit 209, thus the current is not applied to generate the analog data signal ADS. Furthermore, the voltage dividing circuit 207 also consumes currents. Additionally, the AM data from DAC presents at OP input, the OP then has to accommodate wide-range input signal since that AM data may operate a rail-to-rail AM data signal. Therefore, the power consumption for such circuit is high.

SUMMARY

Therefore, one objective of the present application is to provide a voltage generating circuit that can decrease power consumption.

Another objective of the present application is to provide a polar transmitted that can decrease power consumption.

One embodiment of the present application discloses a voltage generating circuit, which comprises: an output terminal; an output current generating circuit, for generating an output current to the output terminal such that an output voltage is generated at the output terminal, according to an output voltage control signal; an amplifier, comprising a first input terminal receiving a reference voltage, a second input terminal receiving a feedback voltage related with the output voltage, and an output terminal for outputting the output voltage control signal according to the reference voltage and the feedback voltage; an adjustable voltage dropping circuit, comprising a first terminal coupled to the second input terminal of the amplifier, and a second terminal coupled to the output terminal; and a current source, for generating a predetermined current (or, a near constant current) to the first terminal of the adjustable voltage dropping circuit, thereby the feedback voltage is generated at the first terminal of the adjustable voltage dropping circuit corresponding to the output voltage. The predetermined current flows through the adjustable voltage dropping circuit to the output terminal. If a resistance value of the adjustable voltage dropping circuit is changed, the amplifier correspondingly outputs the output voltage control signal to adjust the output voltage, thereby the feedback voltage is correspondingly adjusted to have a predetermined difference from the reference voltage.

Another embodiment of the present application discloses a polar transmitter, which comprising a modulating circuit, a phase data signal generating module and an amplitude data signal generating module. The modulating circuit modulates a phase data signal and an amplitude data signal to generate a modulated signal. The phase data signal generating module generates the phase data signal. The amplitude data signal generating module generates the amplitude data signal, and comprises: an output terminal; an output current generating circuit, for generating an output current to the output terminal, such that an output voltage is generated at the output terminal, according to an output voltage control signal; an amplifier, comprising a first input terminal receiving a reference voltage, a second input terminal receiving a feedback voltage related with the output voltage, and an output terminal for outputting the output voltage control signal according to the reference voltage and the feedback voltage; an adjustable voltage dropping circuit, comprising a first terminal coupled to the second input terminal of the amplifier, and a second terminal coupled to the output terminal; a current source, for generating a predetermined current to the first terminal of the adjustable voltage dropping circuit, thereby the feedback voltage is generated at the first terminal of the adjustable voltage dropping circuit corresponding to the output voltage; and an amplitude data signal generating circuit, for receiving the output voltage and for generating the amplitude data signal according to the output voltage. The predetermined current flows through the adjustable voltage dropping circuit to the amplitude data signal generating circuit. If a resistance value of the adjustable voltage dropping circuit is changed, the amplifier correspondingly outputs the output voltage control signal to adjust the output voltage, thereby the feedback voltage is adjusted to have a predetermined difference from the reference voltage.

In view of abovementioned embodiments, the current from the current source can help generate the amplitude data signal. Additionally, no frequency dividing is included in the voltage generating circuit. By this way, the power consumption can be decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
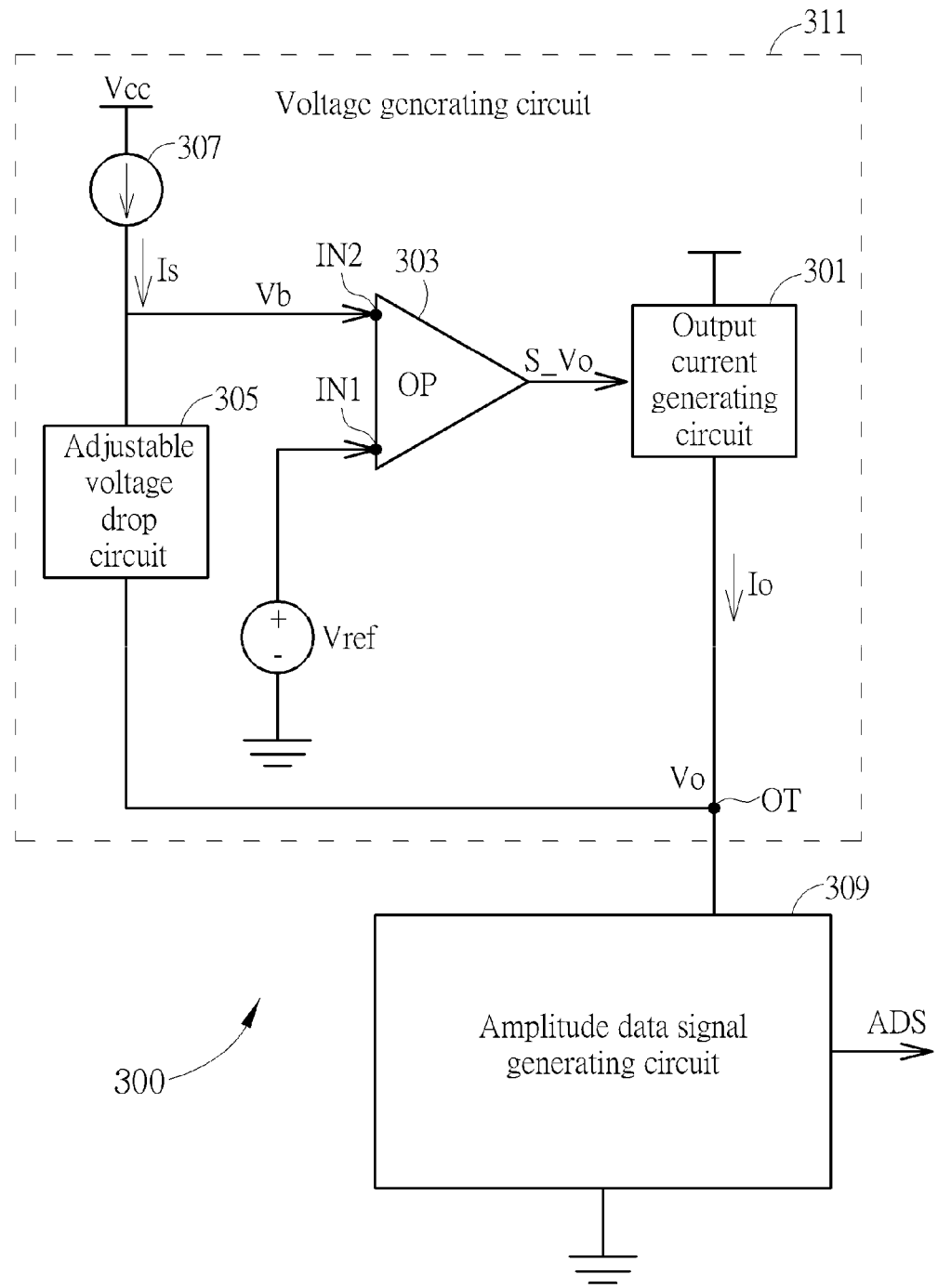
FIG. 3 is a circuit diagram illustrating an amplitude data signal generating module according to an embodiment of the present application.

FIG. 3 is a circuit diagram illustrating an amplitude data signal generating module 300 according to an embodiment of the present application. As shown in FIG. 3, the amplitude data signal generating module 300 comprises: an output current generating circuit 301, an amplifier 303, an adjustable voltage dropping circuit 305, a current source 307, and an amplitude data signal generating circuit 309. The output current generating circuit 301 generates an output current Io and this current flows through other circuits coupled to the output terminal, such that a voltage Vo is generated at the output terminal OT, according to an output voltage control signal S_Vo. The amplifier 303 comprising a first input terminal IN1 receiving a reference voltage Vref, a second input terminal IN2 receiving a feedback voltage Vb related with the output voltage Vo, and an output terminal for outputting the output voltage control signal S_Vo according to the reference voltage Vref and the feedback voltage Vb. The adjustable voltage dropping circuit 305 comprises a first terminal coupled to the second input terminal of the amplifier 303, and a second terminal coupled to the output terminal OT. The current source 307 generates a predetermined current Is to the first terminal of the adjustable voltage dropping circuit 305, thereby the feedback voltage Vb is generated at the first terminal of the adjustable voltage dropping circuit 305 corresponding to the output voltage. In this embodiment, the current source 307 comprises a first terminal coupled to a predetermined voltage Vcc, and a second terminal couple to the second input terminal IN2 of the amplifier 303. However, please note the first terminal of the current source 307 is not limited to couple to the predetermined voltage Vcc. The amplitude data signal generating circuit 309 receives the output voltage Vo and generates the amplitude data signal ADS according to the output voltage Vo.

The predetermined current Is can flow through the adjustable voltage dropping circuit 305 to the amplitude data signal generating circuit 309. Furthermore, if a resistance value of the adjustable voltage dropping circuit 305 is changed, the current flowing through the adjustable voltage dropping circuit 305 changes and the feedback voltage Vb changes as well. In order to adjust the feedback voltage Vb, the amplifier 303 correspondingly outputs the output voltage control signal S_vo to adjust the output voltage Vo, thereby the feedback voltage Vb is adjusted to have a predetermined difference from the reference voltage Vref. In one embodiment, the predetermined difference is close to 0. In another embodiment, the feedback voltage Vb has a voltage difference from the reference voltage Vref since a voltage drop device such as a resistor is provided between the second input terminal IN2 of the current source 307 and an input terminal of the amplifier 303. It will be appreciated the amplifier 303 can be replaced with other comparing devices, such as an integrator.

Please note, the circuit illustrated in FIG. 3 is not limited to be applied to an amplitude data signal generating module for a polar transmitter. In such case, the amplitude data signal generating circuit 309 can be removed or be replaced by other circuits or devices (i.e. a loading device), and the output current generating circuit 301, the amplifier 303, the adjustable voltage dropping circuit 305, and the current source 307 can be regarded as a voltage generating circuit 311 to generate the output voltage Vo.

Figure 4:
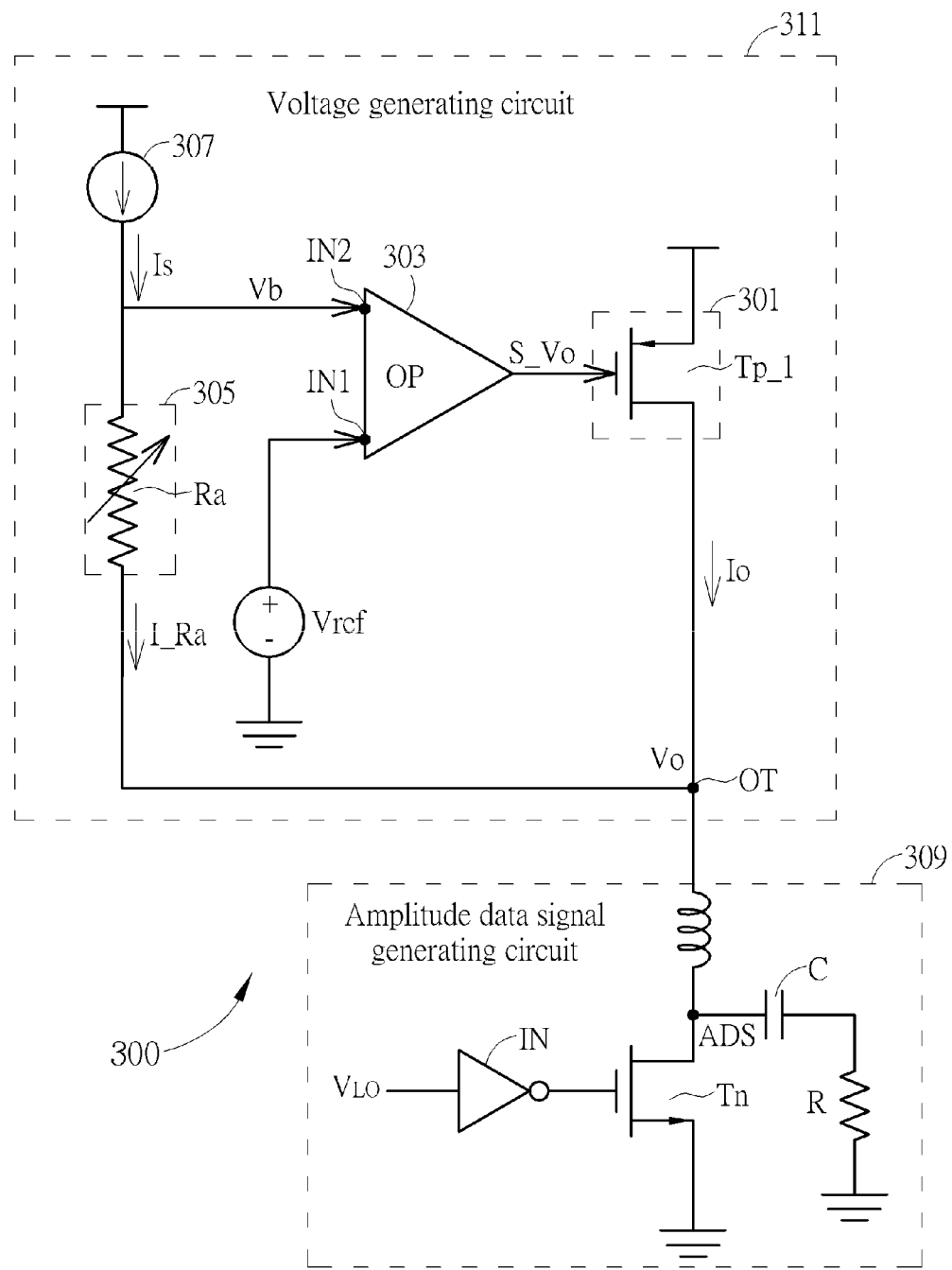
FIG. 4-6 are circuits diagrams illustrating exemplary structures for the amplitude data signal generating module illustrated in FIG. 3.
Figure 5:
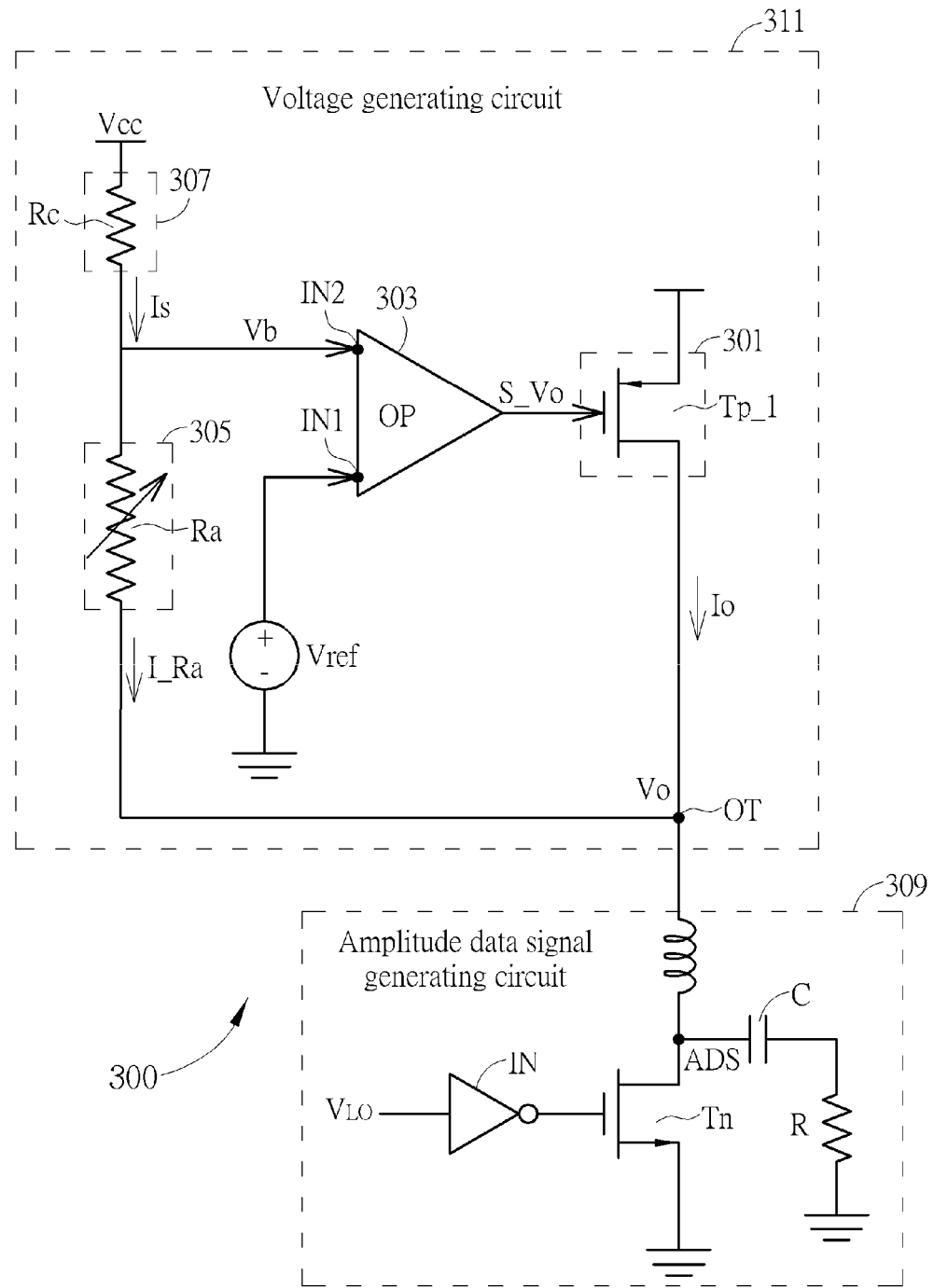
Figure 6:
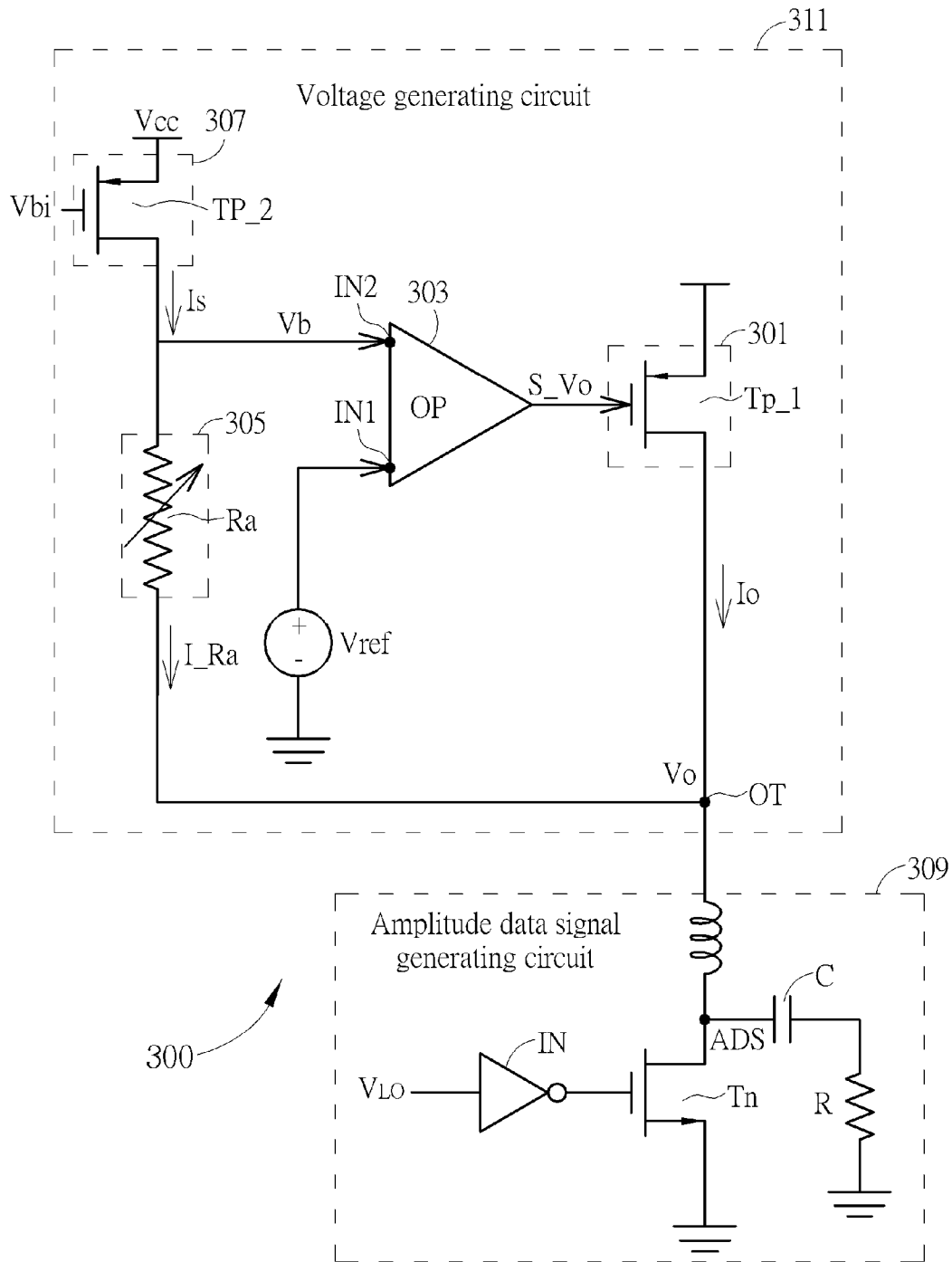

FIG. 4-6 are circuits diagrams illustrating exemplary structures for the amplitude data signal generating module illustrated in FIG. 3. In the embodiment of FIG. 4, the output current generating circuit 301 comprises a PMOSFET Tp_1, and the adjustable voltage dropping circuit 305 comprises an adjustable resistor Ra.

Due to virtual short characteristic of the amplifier 303, the voltage at the second input terminal IN2 of the amplifier 303 is kept close to (or equal to) Vref. Therefore, the output voltage Vo can be shown approximately as Equation (1)

$$Vo = Vref - I\_Ra * Rav \qquad \text{Equation (1)}$$

The Rav means the resistance value of the adjustable resistor Ra; the I_Ra means the current flowing through the adjustable voltage dropping circuit 305. Therefore, if the resistance value Ray changes, the output voltage Vo also correspondingly changes to keep the voltage at the second input terminal of the amplifier 303 at Vref. Thereby the current I_Ra is also adjusted to be the same as the predetermined current Ir. By this way, the output voltage Vo can be controlled via adjusting the resistance value of the adjustable voltage dropping circuit 305.

Also, the amplitude data signal generating circuit 309 comprises an inverter IN, a MOSFET Tn, a capacitor C and a resistor R, to generate the amplitude data signal ADS at a first terminal of the MOSFET Tn. However, please note the amplitude data signal generating circuit 309 is not limited to the circuit structure illustrated in FIG. 4.

Many circuits can be applied as the current source 307. For example, in the embodiment of FIG. 5, the current source 307 comprises a resistor Rc having a first terminal coupled to a predetermined voltage level Vcc and a second terminal coupled to the second input terminal of the amplifier 303. Alternatively, in the embodiment of FIG. 6, the current source 307 comprises a PMOSFET Tp_2 having a first terminal coupled to a predetermined voltage level Vcc, a second terminal coupled to the second input terminal IN2 of the amplifier 303 and a third terminal coupled to a predetermined bias voltage Vbi. However, other circuits besides the embodiments in FIG. 5 and FIG. 6 can be applied as the current source 307.

Figure 1:
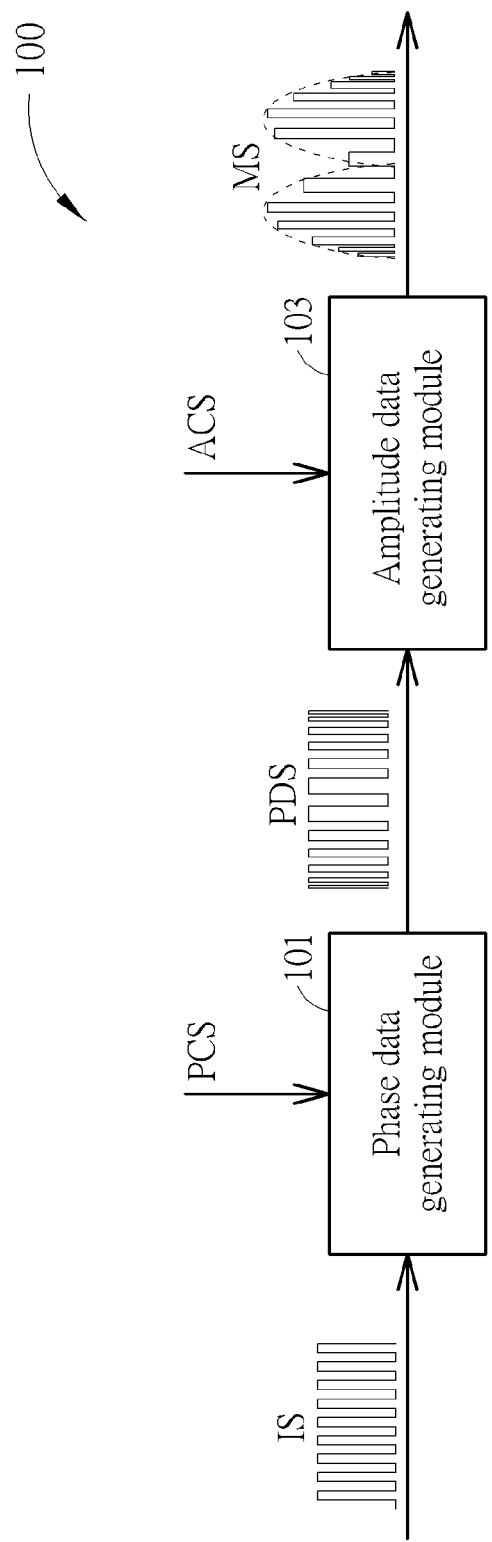
FIG. 1 is a block diagram illustrating a conventional polar transmitter.
Figure 2:
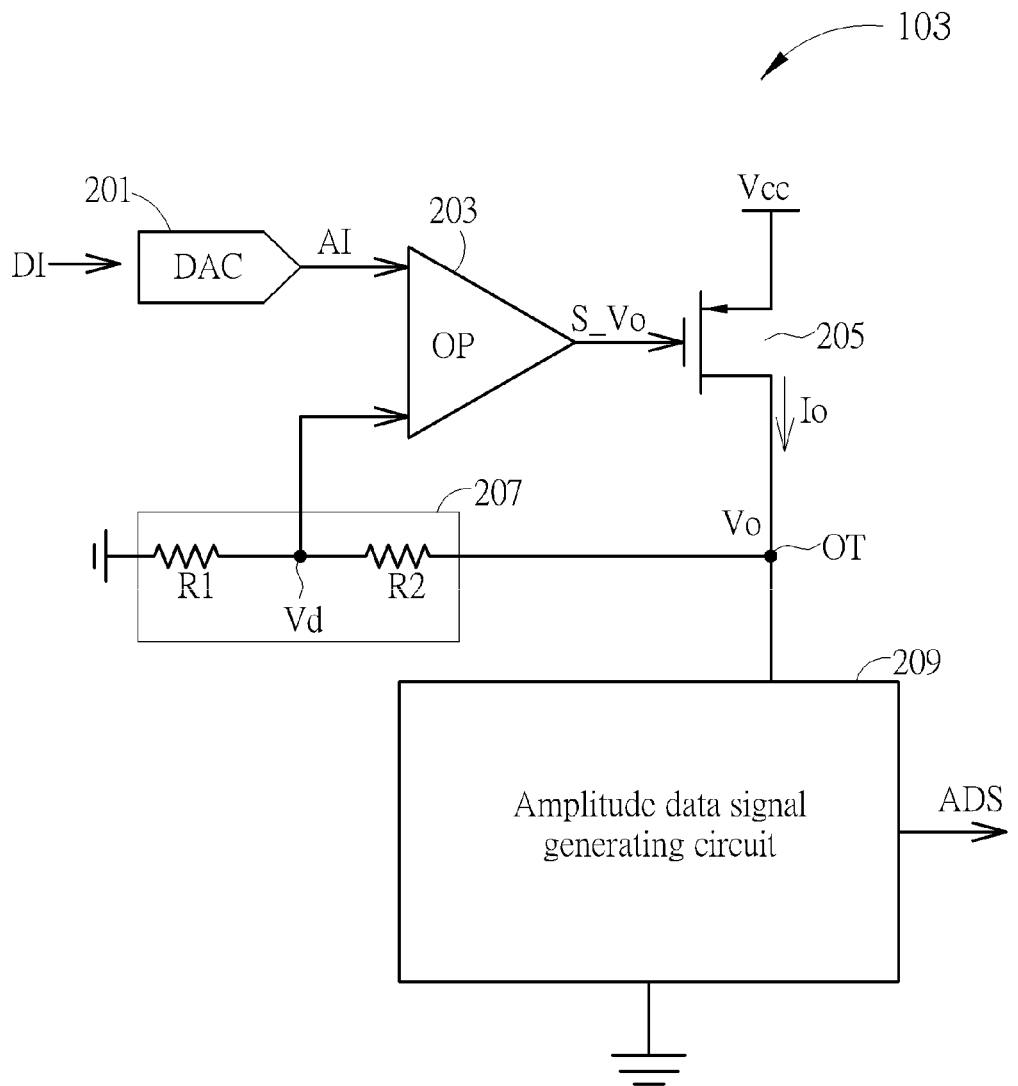
FIG. 2 is a circuit diagram illustrating the amplitude data signal generating module in FIG. 1.

Please note the amplitude data signal generating module according to embodiments of the present application can be applied to the circuit illustrated in FIG. 1, but not limited.

Further, the circuits illustrated in FIG. 3-FIG. 6 can further comprise a switched regulator to improve the circuit performance.

In view of abovementioned embodiments, the current from the current source can help generate the amplitude data signal. Additionally, no frequency dividing is included in the voltage generating circuit. By this way, the power consumption can be decreased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage generating circuit, comprising:
   an output terminal;
   an output current generating circuit, for generating an output current to the output terminal according to an output voltage control signal, wherein an output voltage is generated at the output terminal according to the output current;
   an comparing device, comprising a first input terminal receiving a reference voltage, a second input terminal receiving a feedback voltage related with the output voltage, and an output terminal for outputting the output voltage control signal according to the reference voltage and the feedback voltage;
   an adjustable voltage dropping circuit, comprising a first terminal coupled to the second input terminal of the comparing device, and a second terminal coupled to the output terminal of the comparing device; and
   a current source, for generating a predetermined current to the first terminal of the adjustable voltage dropping circuit, thereby the feedback voltage is generated at the first terminal of the adjustable voltage dropping circuit corresponding to the output voltage;
   wherein the predetermined current flows through the adjustable voltage dropping circuit to the output terminal;
   wherein if a resistance value of the adjustable voltage dropping circuit is changed, the comparing device correspondingly outputs the output voltage control signal to adjust the output voltage, thereby the feedback voltage is correspondingly adjusted to have a predetermined difference from the reference voltage.

2. The voltage generating circuit of claim 1, where the output terminal is coupled to a loading device, wherein the output current generating circuit is an adjustable current providing circuit for generating the output current to the loading circuit, to generate the output voltage.

3. The voltage generating circuit of claim 1, wherein the adjustable voltage dropping circuit is an adjustable resistor.

4. The voltage generating circuit of claim 1, wherein the current source comprises a resistor comprising a first terminal coupled to a predetermined voltage and a second terminal coupled to the second input terminal.

5. The voltage generating circuit of claim 1, wherein the current source comprises a transistor comprising a first terminal coupled to a first predetermined voltage, a second terminal coupled to the second input terminal of the comparing device and a third terminal coupled to a second predetermined voltage.

6. The voltage generating circuit of claim 1, wherein if the resistance value of the adjustable voltage dropping circuit is changed, the comparing device correspondingly outputs the output voltage control signal to adjust the output voltage, thereby the feedback voltage is adjusted to equal to the reference voltage.

7. A polar transmitter, comprising:
   a modulating circuit, for modulating a phase data signal and an amplitude data signal to generate a modulated signal;
   a phase data signal generating module, for generating the phase data signal;
   an amplitude data signal generating module, for generating the amplitude data signal, comprising;
   an output terminal;
   an output current generating circuit, for generating an output current to the output terminal, such that an output voltage is generated at the output terminal, according to an output voltage control signal;
   an comparing device, comprising a first input terminal receiving a reference voltage, a second input terminal receiving a feedback voltage related with the output voltage, and an output terminal for outputting the output voltage control signal according to the reference voltage and the feedback voltage;
   an adjustable voltage dropping circuit, comprising a first terminal coupled to the second input terminal, and a second terminal coupled to the output terminal;
   a current source, for generating a predetermined current to the first terminal of the adjustable voltage dropping circuit, thereby the feedback voltage is generated at the first terminal of the adjustable voltage dropping circuit corresponding to the output voltage; and
   an amplitude data signal generating circuit, for receiving the output voltage and for generating the amplitude data signal according to the output voltage;
   wherein the predetermined current flows through the adjustable voltage dropping circuit to the amplitude data signal generating circuit;
   wherein if a resistance value of the adjustable voltage dropping circuit is changed, the comparing device correspondingly outputs the output voltage control signal to adjust the output voltage, thereby the feedback voltage is adjusted to have a predetermined difference from the reference voltage.

8. The polar transmitter of claim 7, where the output terminal is coupled to a loading circuit, wherein the output current generating circuit is an adjustable current providing circuit for generating the output current to the loading circuit, to generate the output voltage.

9. The polar transmitter of claim 7, wherein the adjustable voltage dropping circuit is an adjustable resistor.

10. The polar transmitter of claim 7, wherein the current source comprises a resistor comprising a first terminal coupled to a predetermined voltage and a second terminal coupled to the second input terminal.

11. The polar transmitter of claim 7, wherein the current source comprises a transistor comprising a first terminal coupled to a first predetermined voltage, a second terminal coupled to the second input terminal of the comparing device and a third terminal coupled to a second predetermined voltage.

12. The polar transmitter of claim 7, wherein if the resistance value of the adjustable voltage dropping circuit is changed, the comparing device correspondingly outputs the output voltage control signal to adjust the output voltage, thereby the feedback voltage is adjusted to equal to the reference voltage.

* * * * *